N. G. EK.
SIEVE CLEANING DEVICE.
APPLICATION FILED SEPT. 29, 1917.
1,341,793. Patented June 1, 1920.
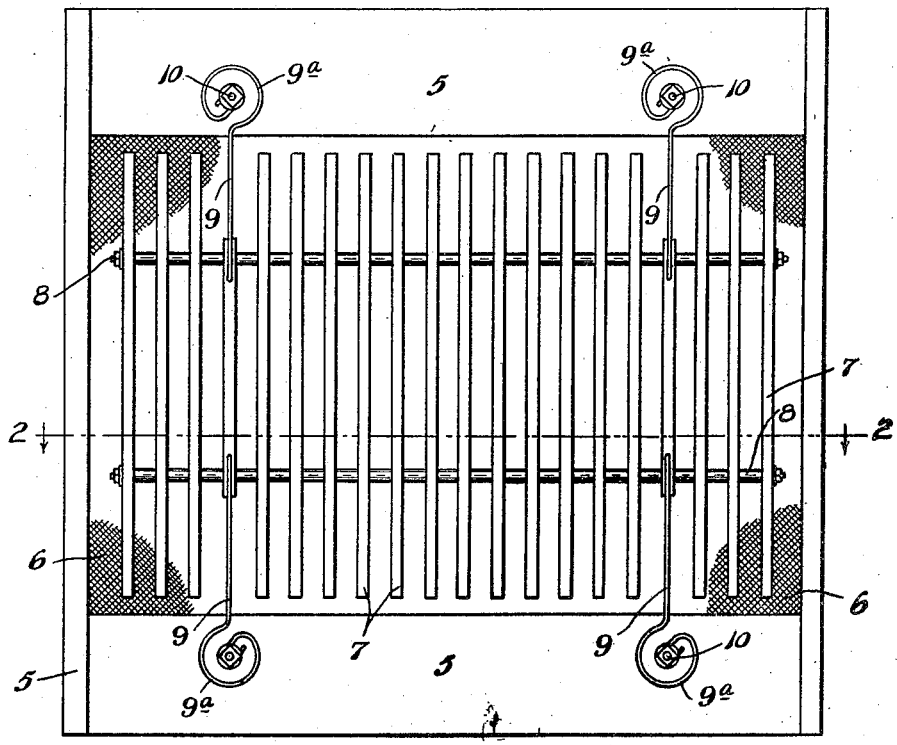
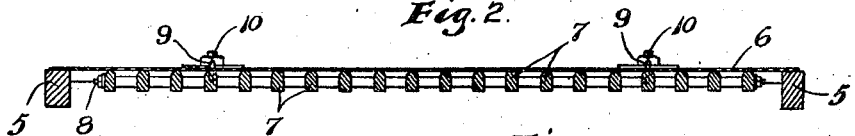
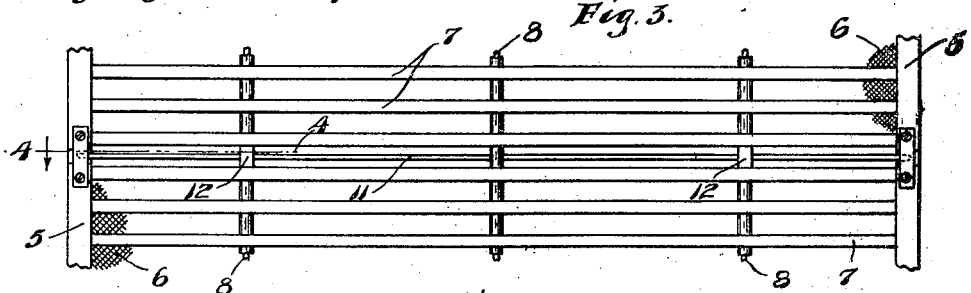
WITNESSES.
H. L. Opsahl.
E. G. Wells
INVENTOR.
NELS GUSTAF EK.
BY HIS ATTORNEYS
Williamson & Merchant

UNITED STATES PATENT OFFICE.

NELS G. EK, OF MINNEAPOLIS, MINNESOTA, ASSIGNOR TO FOSSTON-CARPENTER COMPANY, OF ST. PAUL, MINNESOTA, A CORPORATION OF MINNESOTA.

SIEVE-CLEANING DEVICE.

1,341,793.     Specification of Letters Patent.     Patented June 1, 1920.

Application filed September 29, 1917. Serial No. 193,939.

*To all whom it may concern:*

Be it known that I, NELS G. EK, a citizen of the United States, residing at Minneapolis, in the county of Hennepin and State of Minnesota, have invented certain new and useful Improvements in Sieve-Cleaning Devices; and I do hereby declare the following to be a full, clear, and exact description of the invention, such as will enable others skilled in the art to which it appertains to make and use the same.

My invention has for its object to provide an extremely simple and highly efficient sieve cleaning device adapted for general use, but particularly adapted for use in connection with the vibratory sieves of fanning mills, grain separators and cleaners. To the above ends, the invention consists of the novel devices and combination of devices hereinafter described and defined in the claims.

The invention is illustrated in the accompanying drawings, wherein like characters indicate like parts throughout the several views. Referring to the drawings, Figure 1 is a bottom plan view showing a sieve and one of my improved cleaning devices applied thereto;

Fig. 2 is a section taken on the line 2—2 of Fig. 1;

Fig. 3 is a fragmentary bottom plan view showing a slightly modified form of the cleaning device; and Fig. 4 is a fragmentary section on the line 4—4 of Fig. 3.

The numeral 5 indicates the frame and the numeral 6 the reticulate or perforate surface surface of the sieve or screen. Working over the bottom of the sieve 6 is a cleaning rack made up of bars 7 and connecting and spacing rods 8. Cleaning racks of this general character have hitherto been used, but it has been customary either to impart positive movement thereto, or to hold the same stationary while the screen is vibrated over said rack. Also, it is customary to bevel the upper edges of the bars 7 and to arrange the sharp edges for light scraping or frictional contact with the undersurface of the sieve.

My invention relates to novel means for supporting the cleaning rack or cleaner proper from the sieve frame or other part that vibrates with the sieve surface, and it consists broadly in providing a spring connection between the two.

In the frame illustrated in Figs. 1 and 2, the rack is supported and connected to the sieve frame by spring arms or members 9 having their free ends attached, preferably, to relatively short members of the cleaning bars and having their outer or anchored ends made in the form of coils or loops 9ª, which, by means of nut-equipped bolts 10, or the like, are anchored to the sides of the frame 5. This sieve shown in Figs. 1 and 3, will be arranged to be vibrated in the direction of the guiding rods 8, which is at a right angle to the cleaning bars 7.

When a sieve of this character is vibrated or reciprocated in the direction indicated, a vibratory movement of the cleaning rack in respect to the sieve will be set up. This is due to the fact that the reciprocating movements of the sieve will be made positive by crank or eccentric devices, for example, and when this vibration is at considerable speed, the momentum of the rack will cause the same to continue its movement in the direction of the reciprocation for an interval after the sieves have been given a return or opposite movement and, consequently, of course, the more rapid the vibration of the sieve, the greater will be the movement of the cleaning rack in respect to the sieve surface. In practice, a cleaning rack supported as described, has been found to work in the most satisfactory manner.

In the arrangement shown in Figs. 3 and 4, the spacing connection is formed by straight spring rods 11, which, at their ends are anchored to the sides of the sieve frame 5, and at their intermediate portions are passed through clips or lugs 12 secured on certain of the rods 8 of the rack. This arrangement shown in Figs. 3 and 4, operates on the same plan as that shown in Figs. 1 and 2, but the rods 11 are somewhat less resilient than the spring arms 9.

Both forms of the device have, in practice, been found efficient for the purposes had in view.

What I claim is:

1. The combination with a sieve and means for imparting a "to and fro" vibratory movement thereto, of a cleaning rack comprising a multiplicity of closely positioned parallel bars extended transversely of the direction of vibration of said sieve, and resilient rack supporting arms connected to said rack at their inner portions and anchored to the sieve structure, the said spring arms being also extended transversely of the direction of vibration of said sieve and serving to hold said rack normally in intermediate positions.

2. The combination with a sieve and means for imparting a "to and fro" vibratory movement thereto, of a cleaning rack comprising a multiplicity of closely positioned parallel bars extended transversely of the direction of vibration of said sieve, and resilient rack supporting arms connected to said rack at their inner portions and anchored to the sieve structure, the said spring arms being also extended transversely of the direction of vibration of said sieve and serving to hold said rack normally in intermediate positions, said resilient arms, at their outer anchored ends being in the form of helical coils.

In testimony whereof I affix my signature in presence of two witnesses.

NELS. G. EK.

Witnesses:
BERNICE G. BAUMANN,
HARRY D. KILGORE.